Jan. 26, 1937.  A. F. HICKMAN  2,068,676

VEHICLE SPRING SUSPENSION

Filed Oct. 12, 1932  5 Sheets—Sheet 1

INVENTOR
Albert F. Hickman
BY Popp & Powers
ATTORNEYS

Jan. 26, 1937.  A. F. HICKMAN  2,068,676
VEHICLE SPRING SUSPENSION
Filed Oct. 12, 1932   5 Sheets-Sheet 3

INVENTOR
Albert F. Hickman
BY Popp & Powers
ATTORNEYS

Jan. 26, 1937.  A. F. HICKMAN  2,068,676
VEHICLE SPRING SUSPENSION
Filed Oct. 12, 1932   5 Sheets-Sheet 4

INVENTOR
Albert F. Hickman
BY Popp & Powers
ATTORNEYS

Patented Jan. 26, 1937

2,068,676

UNITED STATES PATENT OFFICE 2,068,676

VEHICLE SPRING SUSPENSION

Albert F. Hickman, Eden, N. Y., assignor to Hickman Pneumatic Seat Company, Inc., Eden, N. Y., a corporation of New York Application October 12, 1932, Serial No. 637,444

4 Claims. (Cl. 267—27)

This invention relates to a resilient connection between the wheels and frame of a vehicle, and relates more particularly to that form of non-energy-dissipating (non-friction) spring suspension in which a spring opposes wheel movement through a leverage arrangement wherein the effective torque reaction to said wheel movement sinusoidally approaches a value of zero, constituting what I term a "non-bottoming" spring action. Specifically the invention relates to the means of resiliently restraining rotation of the rock shaft or its equivalent, and to the organization of parts cooperating therewith.

The principal object of the invention is to provide a "non-bottoming" and a "non-side-sway" spring action in which the secondary spring is self contained to permit of easy assembly, and is enclosed so as to be sealed from dust and dirt, and in addition is capable of being self lubricated for the full life of the vehicle. Another object of the invention is to provide a spring suspension which permits of the use of one standard secondary spring for all weights and types of vehicles and also permits of the rest of the working parts of the spring suspension being readily manufactured for all widths of vehicles. A further object of the invention is to provide a simple and inexpensive spring suspension which may be readily assembled or disassembled, and in which the parts are not subjected to heavy strains as a consequence of frame distortion. A still further object of the invention is to so secure the secondary springs as to prevent any liability of fiber stresses above the fatigue limits of the metal used. Yet another object of the invention is to prevent any of the parts from moving past a dead center position into an undesirable relationship. Numerous other collateral objects of the invention and practical solutions thereof are disclosed in detail in the herein patent specification.

This invention is a continuation in part of the following patent applications: Ser. No. 497,653, filed Nov. 24, 1930, Vehicle spring and shock absorber suspension, Ser. No. 572,549, filed Nov. 2, 1931, Vehicle spring suspension, Ser. No. 573,325, filed Nov. 6, 1931, Flying machine landing gear, Ser. No. 595,973, filed Feb. 25, 1932, Vehicle spring suspension, and Ser. No. 613,395, filed May 25, 1932, Resiliently mounted wheel.

In the accompanying drawings.

Similar characters of reference indicate like parts in the several figures of the drawings.

My invention may be embodied in various forms and in vehicle spring suspensions of different constructions, and the present applications are therefore to be regarded merely as a few of the organizations which may satisfactorily carry out the invention in practice. As here shown, and referring for the present to only Figs. 1–8, the same is constructed as follows:

The present invention may be applied to either the front or rear ends of either a two or a three axle vehicle or it may be applied to the spring suspension of a trailer, tractor, aeroplane, boat, railway train or other vehicle or to the "floating" wheels which have a non-bottoming connection with the axle upon which they are carried (see my various patent applications previously listed).

In this construction of Figs. 1-8, however, the spring suspension is illustrated as applied to the rear or drive axle of a two axle, self propelled vehicle having a "Hotchkiss" drive. In this case the drive axle housing 30 is secured by clip bolts 31 to the central part of a semi-elliptic leaf spring 32, the front end of which is pivoted at 33 (see Figs. 14-17) to the frame 34 of the vehicle.

Figure 1:
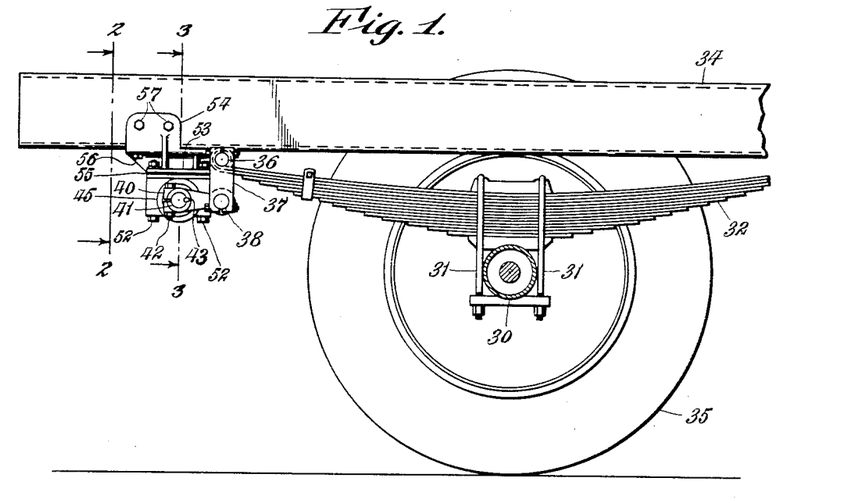
Fig. 1 is a diminutive side elevation of the rear end of a two-axle vehicle with the near wheel removed.
Figure 2:
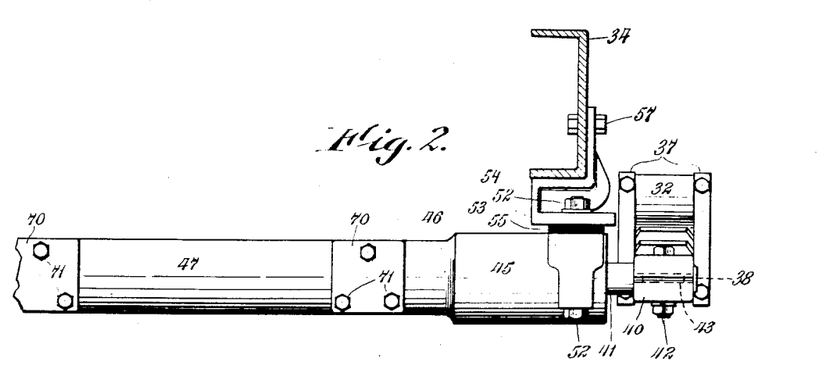
Figs. 2 and 3 are vertical, transverse, fragmentary sections thereof taken on correspondingly numbered lines of Fig. 1.
Figure 3:
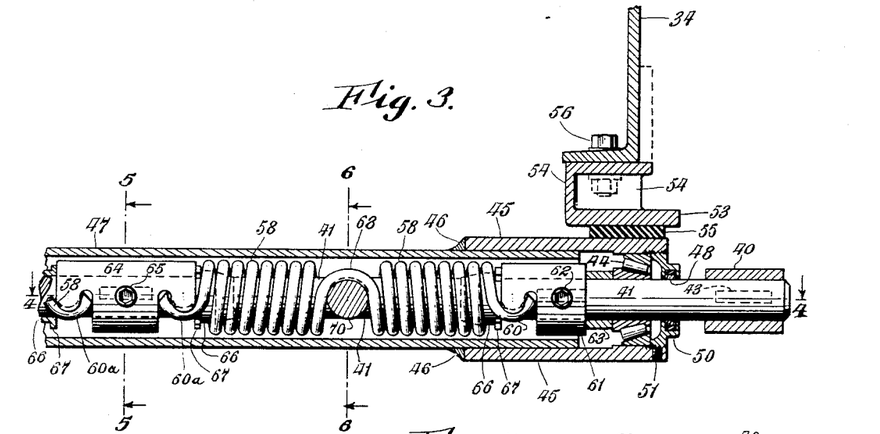
Figure 4:
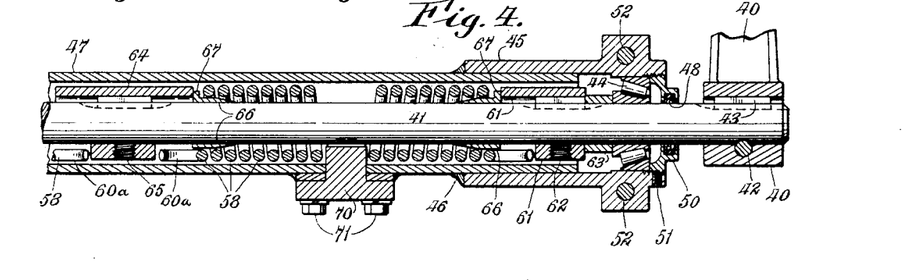
Fig. 4 is a horizontal, fragmentary section through the rock shaft and associated parts taken on line 4—4, Fig. 3.
Figure 5:
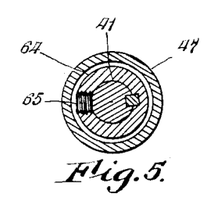
Figs. 5 and 6 are vertical, transverse sections through the rock shaft and associated parts taken on correspondingly numbered lines of Fig. 3.
Figure 6:
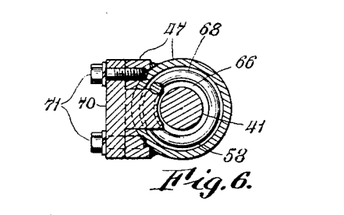
Figure 7:
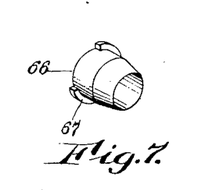
Figs. 7 and 8 are detached perspective views of the centering collar and stud plate respectively.
Figure 8:
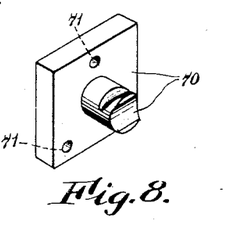

Journaled on opposite ends of said drive axle housing 30 in any suitable manner is the usual pair of drive, ground wheels, only the far drive wheel 35 being illustrated in Fig. 1.

The rear end of aforesaid main spring 32 is pivoted at 36 to the one end of a bifurcated link 37 while the other end of said link is pivoted upon the crank pin or eccentric member 38 of a crank arm 40. The hub of said crank arm is suitably split and held firmly on the outboard end of a rock shaft or torque member 41 by a clamp bolt 42, while rotation of said crank arm, relative to said rock shaft, is positively prevented by a suitable key 43.

Said rock shaft 41 extends horizontally and transversely clear across the vehicle and is similarly provided at its opposite end with a similar crank arm 40, and similarly operatively connected with a bifurcated link 37, main spring, etc.

Said rock shaft 41 is journaled at opposite ends (by means of suitable roller or other bearings 44) in cylindrical bearing housings 45, the two bearing housings receiving within their bores, and being welded at 46 to, a tubular casing 47. Said bearing housings 45, taken together with said casing 47, constitute a fluid-tight, tubular, integral member, the escape of lubricating oil from each end of which is prevented by an oil retainer washer 48 suitably received with a counterbored, annular channel formed in the bore of a cap 50. The latter is provided with an external screw thread which meshes with an internal screw thread formed in the outer portion of the bore of its companion bearing housing 45. These caps, by reason of their screw threaded engagement with their companion bearing housings 45, are also adapted to adjust the roller bearings 44 by being moved inwardly the desired distance against the outer races of said bearings and then locked in place by suitable headless set screws 51.

Each bearing housing 45 is provided with a pair of horizontally and laterally projecting ears which are secured by bolts 52 to the lower flange 53 of a bracket 54. A pad 55 of rubber or other suitable resilient material is interposed between each bearing housing and said flange 53 so as to allow a very slight movement between said brackets and said housings when distortion of the vehicle frame occurs. To permit of this slight distortion, the holes in said flange 53 and the ears of said bearing housing 45 are formed slightly larger than the diameter of the bolts 52, thus permitting the bolt to carry only the vertical pressures while the rubber pad carries the twisting, bending and shear forces. The brackets themselves are secured directly to the vehicle frame 34 by bolts 56 and 57.

Rotation of the rock shaft 41 relative to its bearing housings 45 and casing 47 (and hence to the vehicle frame 34) is resiliently restrained by two pairs of helical or other curvilinear springs 58 which are disposed concentrically with respect to both said rock shaft 41 and said casing 47. The outer end of each pair of springs 58 is reversely curled at 60 and is snugly received within a pocket formed at the inner end of a companion outer torque collar 61. The latter is suitably keyed to the rock shaft 41, and is restrained against longitudinal movement relative thereto by a headless set screw 62. A distancing sleeve 63 is arranged on the rock shaft 41 between said torque collar 61 and the inner race of the tapered roller bearing 44 so as to restrain longitudinal, inward movement of said inner roller bearing race.

The inner end of each of the pairs of concentric, helical springs 58 is reversely curled at 60a similarly to its outer end 60 and is similarly restrained against rotation relative to the rock shaft 41 by a central, dual, torque collar 64 which (like the outer torque collars 61) is suitably keyed to said rock shaft 41, and is secured in place by a headless set screw 65.

Adjacent said collars 61 and 64, each pair of springs 58 is maintained in proper concentric position relative to the rock shaft 41 by reason of an annular, centering thimble 66 (see Figs. 7, 4 and 3) which is preferably tapered at its one end toward the center of its companion pair of curvilinear springs 58 and is provided at its opposite, straight cylindrical other end with a laterally and outwardly projecting annular flange 67 which is cut away at one portion of its periphery to accommodate the reversely curled portion 60 and 60a of the adjacent end of the companion spring 58.

The adjacent ends of each pair of springs 58 are integrally joined by a loop 68 which is prevented from rotating relatively to the casing 47 by the provision of a stud plate 70 (see Figs. 8, 6, 4 and 3), the latter being secured by cap screws 71 to said casing 47.

Figure 9:
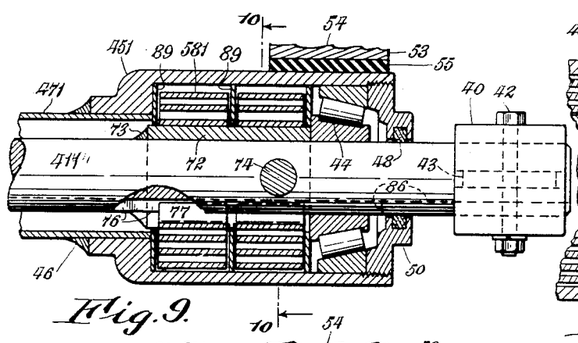
Fig. 9 is a vertical, fragmentary, longitudinal section through one end of a modified form of rock shaft and having spiral instead of helical springs.
Figure 10:
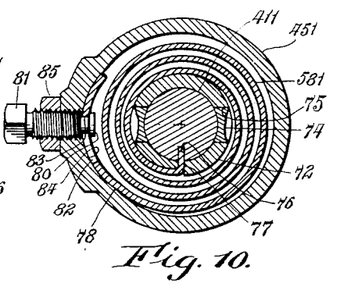
Fig. 10 is a vertical, transverse section on line 10—10, Fig. 9 through the rock shaft and one of its spiral springs.
Figure 11:
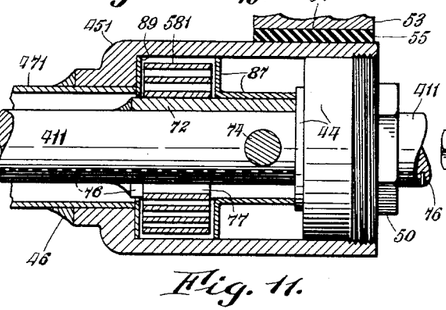
Fig. 11 is a vertical, fragmentary section similar to Fig. 9 but with one of the helical springs replaced by a filler piece so as to reduce the resilient torque force imposed upon the rock shaft.

In the construction of Figs. 9, 10 and 11 (as in the previously described construction) concentric, curvilinear springs are used to resiliently restrain rotation of the rock shaft, but, in this case, spiral curvilinear springs 581 instead of the helical curvilinear springs 58 are employed in this capacity. Because of the relatively small diameter of the rock shaft 411 (which otherwise would cause too sharp a bending of the inner coil of the spiral springs 581), an enlarging-sleeve 72 is employed, the same being welded to the rock shaft 411 both at its inner end at 73 and also by flowing molten metal 74 into a pair of diametrically arranged holes 75 formed in said sleeve.

After such a sleeve 72 has been welded onto each end of said rock shaft 411, a relatively narrow keyway 76 is longitudinally milled along the entire length of said shaft and through both of said enlarging sleeves 72. This keyway 76 may either be milled radially, as shown, or, if the market prefers a better construction at a higher price, said keyway may be cut, in a manner well known in the art, at an angle to a straight plane intersecting the axis of said rock shaft. Each of the spiral springs 581 is provided at its inner terminus with an inturned tongue 77 which engages with that portion of said keyway 76 which is located in both the rock shaft 411 and the companion enlarging sleeve 72.

In the particular position illustrated in the drawings (see particularly Fig. 10), this keyway 76 is seen to lie on the lower face of the rock shaft 411. This corresponds to the position of the spring suspension shown in Fig. 15, i. e., the position when the vehicle is unloaded and motionless,—this being the position in which the least lateral pressure at the outboard end of the rock shaft occurs, and hence constitutes the position in which said shaft requires the least strength for the sustaining of such a lateral load. This question does not, of course, have anything to do with the torque strength of, and the stresses set up in, said rock shaft, such stresses being entirely unaffected by the peripheral position of said keyway 76.

Figure 14:
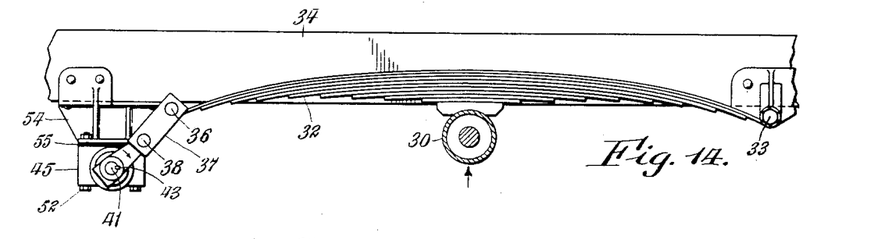
Figs. 14–17 are diminutive, diagrammatic views illustrating the action of the main spring in combination with the rock shaft and associated parts.
Figures 16, 17, 18:
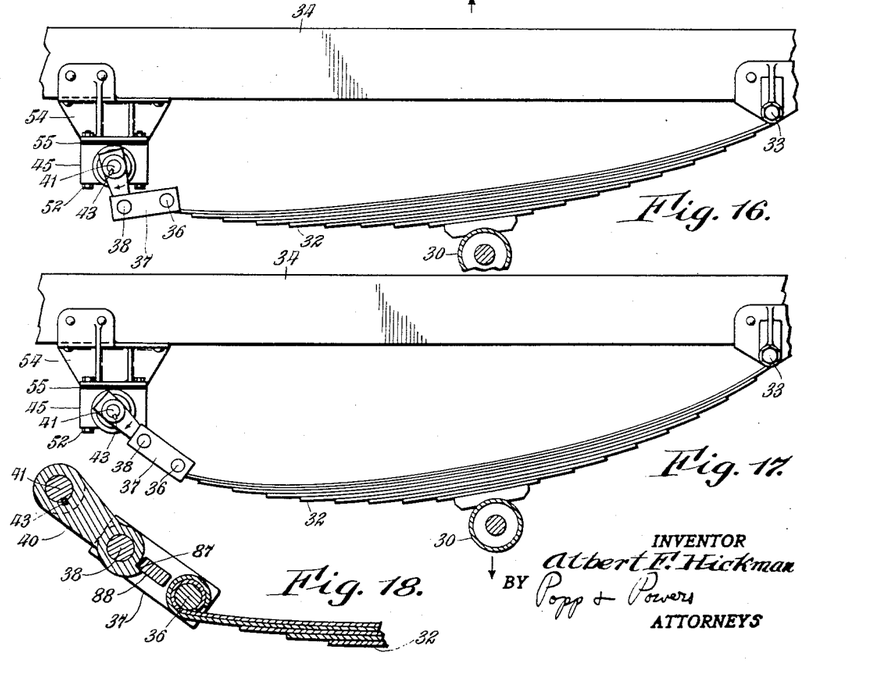
Fig. 18 is a fragmentary, vertical section through the crank arm, link, etc. in the position illustrated in Fig. 17 and showing the means of preventing the link from moving past dead center.

The heaviest bending stresses on said rock shaft 411 occur when the spring suspension is in the position of Figs. 14 and 17, and it is obvious that the bending force in both of these cases lies in a straight plane intersecting both the axis of the pivot 38 and the axis of said rock shaft 411. In these positions the keyway 76 is disposed at approximately ninety degrees to this plane and therefore constitutes an I-beam in effect (with however only a groove on the one side) when in these particular positions which require maximum bending strength.

The keyway which is formed in the crank arm 40 for the reception of key 43 is cut slightly to one side of a straight plane intersecting the axis of the hub of said crank arm 40 (axis of rock shaft 411) and the axis of pivot 38 (see particularly Figs. 14-18 where it is shown positioned slightly clockwise of such a plane). By thus offsetting the keyway formed in the hub of said crank arm 40, it is possible to position said crank arm in either one of two angular positions on the rock shaft,—thereby enabling the secondary springs 58 and 581 to exert either one of two optional torque forces at any one given position of the crank arm 40. Such an adjustment is usually made when the spring suspension is being installed for the purpose of giving the most desirable angular range of movement of the crank arm for the particular vehicle being equipped, this range depending upon the weight of the body, chassis load, etc. This adjustment may moreover be effected at any time subsequent to the time when the original installation was made, if the same proves later to be advantageous.

It is highly desirable, particularly in the case of the secondary, curvilinear springs 58 and 581, that all local stresses be kept below not only the elastic limit but also below the fatigue limit. For this reason it is very desirable not to bend any portion of any of said springs through a sharp angle. One method of preventing such an occurrence consists in having the first quarter turn of each spiral spring 581 of spiral form and the next quarter turn of concentric form, and the rest of the turns of spiral shape except the final quarter turn which will be presently described. In such a construction both the first and second quarter turns of each spiral spring 581 are in direct contact at all times with the periphery of the enlarging sleeve; the latter being formed spirally on one-fourth of its periphery to snugly receive the first spiral quarter turn of each spiral spring and otherwise being of straight cylindrical form. By this construction the stress upon the inturned tongue 77 of the spring is considerably relieved just as the boatman considerably relieves his exertions when holding a large vessel by passing the vessel's hawser around a pile or nigger head. Such a construction is obviously somewhat expensive and hence for most commercial production said spiral spring is made of spiral shape from its beginning to its end (except for its tongue 77) and the enlarging sleeve suitably formed to receive the spiral inner end of said spring by having a greater or larger portion of its periphery of spiral form.

In its most satisfactory construction as regards operation, the last quarter turn of each spiral spring is neither of concentric form nor is it of the same spiral form as that of the main portion of the spring but is out-of-center and curved, commencing at the point 78. The reason for this form at the outer end of the spring is to ensure that said spring at all times will clear the head 80 of the clamp screw 81. It should be understood that such detailed refinements are expensive and are not at all necessary if the invention is being manufactured on a production, low-cost basis.

The clamping screw 81 just mentioned is adapted to firmly secure the outer end of its companion spiral spring 581 to the bearing housing 451. To enable the annular enlarged portion or head 80 of said clamping screw 81 to be passed through said spiral spring 581, the outer end of said spring is provided with a semi-circular opening 82 which opens into a slot 83 to form what is commonly termed a "key" shaped aperture. In assembling each spiral spring, the head 80 of its companion clamp screw 81 is passed througn said semi-circular opening 82 and the spring then partially rotated to cause the shank or reduced portion of said screw 81 to pass into the slot 83. Said screw is screw threaded in the bearing housing 451 and this permits of rotating said screw in a counterclockwise direction (as viewed from its outer end) and thus forcing the out-of-center, curved portion of the spring into its pocket 84. The clamping screw 81 is then held in this position by a lock nut 85. If desired, washers 89 may be placed on each side of each spring to prevent any possibility of interference with the spring movement.

Figure 9A:
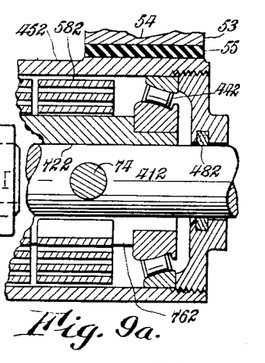
Fig. 9a is a vertical fragmentary section showing a construction similar to that of Fig. 9 but slightly modified as to the bearing and washer arrangement.

Fig. 9a illustrates a slightly modified method of journaling the rock shaft 41 in the bearing housing 452. In this case the washers 89 have been dispensed with and the inner race of the self aligning, roller bearing 442 is seated directly upon the enlarging sleeve 722. This permits the seat of each inner roller bearing race to be machined after both of the enlarging sleeves have been welded at 73 and 74 to the rock shaft 412, thus ensuring that the roller bearings will be accurately in alignment with each other. The use of said self aligning, roller bearing 442 furthermore ensures accurately maintained bearing alignment when the bearing housings 452 become distorted relatively to each other as a result of frame distortion which necessarily occurs to some extent when the vehicle is traveling over very rough roads. It will be noticed in this construction of Fig. 9a that the outside diameter of the enlarging sleeve 722 is considerably greater than that of the enlarging sleeve 72 of Figs. 9 and 10. This permits the use of rock shafts 412 of greatly varying diameters (for different types and weights of vehicles) and still enables the rest of the parts to be of standard form except as to the necessary machining operations required thereon. Another point to be noted as to Fig. 9a is that the keyway 762 does not extend into the rock shaft 412. This enables the oil retaining washer 482 to bear on the unbroken peripheral surface of said rock shaft 412. In the construction of Figs. 9, 10, 11 and 12 it was necessary, in order to obtain oil tightness, to fill the outer end of the rock shaft keyway 76 by inserting a short closure block 86 of rectangular cross section in the outer end of said keyway 76.

All of these spiral spring constructions have one notable feature in common, i. e., the bore of the cylindrical bearing housing (and also the bore of the tubular casing) in each case is so much greater than the diameter of the rock shaft journaled therein that a sufficient supply of lubricating oil may be carried in said housing to ordinarily last the entire life of the car. This condition is obtained by reason of the fact that the oil retainer washer 48 does not have to dam back a solid body of lubricating oil so long as the oil level is at or below the bottom of the companion rock shaft 411. A supply of oil with such a level is ordinarily ample to lubricate all of the bearings of the herein spring suspension (except the shackle bearings) during the entire life of the vehicle.

The present invention has been designed specifically for production manufacture. Fig. 11 illustrates one instance thereof, this construction being such that the resilient opposition to rotation of the rock shaft 411 may be materially reduced (either before or after installation) without affecting the organization of the parts in general. In this case only one spiral spring 581 is employed instead of two as in Fig. 9. While not strictly necessary, a sheet metal or other filler piece 87 is inserted in place of the absent spring. It is obvious that the absent spring may be replaced at any subsequent time if a greater torque resilience is desired for taking care of heavier loads, different axle position or for any other reason.

Figure 12:
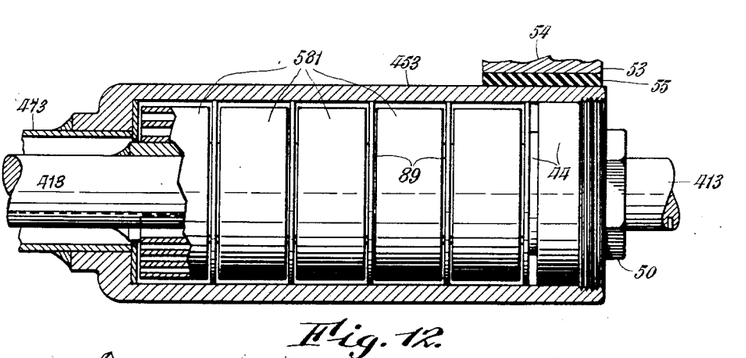
Fig. 12 is a vertical, longitudinal section similar to Fig. 9 but showing a considerable number of spiral secondary springs.
Figure 13:
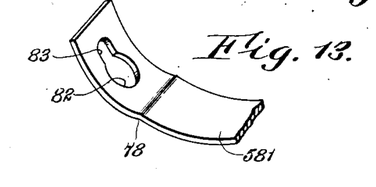
Fig. 13 is a fragmentary perspective of the outer end of one of the spiral secondary springs of Figs. 9, 10, 11 and 12.

In Fig. 12 is shown the means whereby an extremely strong resilient torque is obtained with the same general organization of parts and without requiring a special type of spring for this large torque. In this case a plurality of standard, spiral springs 581 are connected in series with each other, the same being received within a bearing casing 453 which is of greater length than the casings of Figs. 9, 9a, 10 and 11 and is thereby able to accommodate an extra number of springs. The rest of the parts of this construction are made from standard stock and the holes drilled into the vehicle frame in the same manner as before. It is to be understood that, in all cases, both the rock shaft 41, 411, 412, 413 and the casings 47, 471, and 473 are kept on hand in the form of raw stock to which the various parts are welded and joined in accordance with the dimensions of the particular vericle being equipped with the spring suspension. It is also to be understood that the number of springs at one end of the rock shaft 411 does not have to be the same as the number of the springs at the other end of the same rock shaft. For instance, said rock shaft may be equipped at one end with one or more spiral springs 581 and no springs at all at the other end. In this case, obviously, a very simple form of bearing housing may be employed at the end which does not carry spiral springs. Without question the functioning of the spring suspension is best when the rock shaft 411 is symmetrically equipped at its opposite ends with an equal number of spiral springs, but there are many important factors to be considered in vehicle design such as cost, accessibility, clearance for other parts of the vehicle, etc. etc. and it is therefore distinctly advantageous that the present spring suspension is capable of being organized in a multiplicity of manners without materially impairing its functioning. Another such example of flexibility of design should be noted,—namely that, when such a long bearing housing 453 as that shown in Fig. 12 has been installed, any desired number of spiral springs 581 may be removed so as to cut down the torque resilience without requiring a change in any other of the working parts.

Figs. 14–18 illustrate the interaction of the curvilinear (helical or spiral) springs upon the rest of the spring suspension, and in particular illustrate the fact that a "non-bottoming" spring action occurs at both upward and downward extreme positions of the axle even though the torque arm 36 of my patent application Serial No. 497,653 (see Figs. 3–6) is not here employed.

Fig. 14 illustrates the extreme upward movement of the axle, in which case the axes of 41, 38 and 36 lie in substantially one straight plane, the movement toward the straight plane position being opposed by the clockwise, resilient torque imposed upon the rock shaft 41. This constitutes the "non-bottoming" action for upward axle movement.

Figure 15:
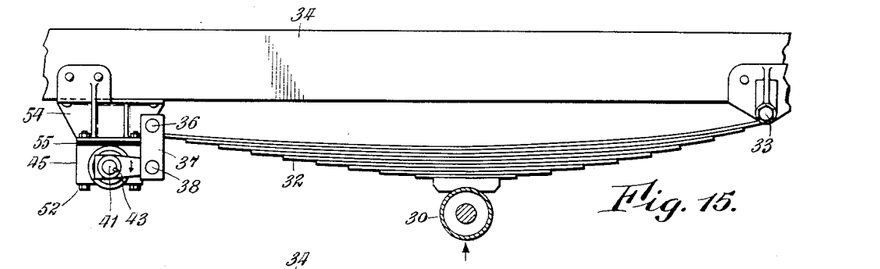

Fig. 15 illustrates the position of the spring suspension parts when the vehicle is unloaded and motionless. In this position an increase or decrease in vertical axle pressure results in a maximum of vertical axle displacement, due to the fact that the pivot 38 is at its maximum leverage relatively to its effective torque force upon the rock shaft 41. In this position of Fig. 15 there is substantially no flexure at all as to the main spring, for small increments of upward and downward axle movement.

Fig. 16 illustrates the spring suspension position when the resilient torque upon rock shaft 41 is producing no effect whatsoever upon the vertical position of the axle. This is because, in this position, the axes of pivots 38, 36 and 33 all lie in one straight plane. This position may be considered to be a "free" or neutral" position in which there is no resistance to either upward or downward movement of the axle (leaving out of account, for the sake of simplicity, such collateral matters as the mass of the parts and whatever kinetic energy they may possess while in motion).

In Fig. 17 is shown how the resilient torque force imposed upon the rock shaft 41 by its secondary, curvilinear springs opposes downward movement of the axle in a "non-bottoming" fashion, this feature being here also obtained by reason of the fact that again the axes of 41, 38 and 36 arrive substantially in one straight plane, and hence the resilient torque of the rock shaft is able to impose a force upon the crank pin 38 which approaches infinity as to its opposition to an actual straight plane relationship. Thus a "non-bottoming" upward and downward action is obtained even though the resilient torque imposed upon the rock shaft is at all times in the one single direction. This is an improvement over the arrangement shown in my patent application Serial No. 497,653 where the force transmitted by the torque arm 36 upon its rock shaft reverses itself every time it passes the "free" or "neutral" position.

Statically considered, the axes of 41, 38 and 36 can never lie in one straight plane. There are, however, strong kinetic forces occurring in the actual operation of a spring suspension of this type which have been found sufficiently powerful in actual practice to not only move these axes to, but even beyond, the straight plane position. This would be particularly undesirable if it occurred in the position of Fig. 17. To avoid such a possibility, the crank arm 40 and link 37 are so arranged as never to be capable of quite reaching the dead center position when the axle is in the extreme lower position of Fig. 17. This is accomplished by providing a suitable stop to limit the relative movement of crank arm and link. In Fig. 18 is illustrated a stop 87 formed on the crank arm 40 and adapted to bear against the web 88 of the bifurcated link 37 when the axes of 41, 38 and 36 have almost arrived in a straight plane.

A similar stop could also be arranged to prevent an excessive relative movement of said link and crank arm beyond the position of Fig. 14. In such case the stop would be preferably arranged to allow said link and crank arm to move some distance beyond the straight plane position of Fig. 14, this being preferable because the resilient torque of the rock shaft 41 not only acts in a direction which opposes self locking of the parts if they should go beyond dead center because of the inertia forces involved, but acts with a greater torque force than that of Fig. 17, in which position said torque shaft has been partially "unwound" as compared to the position of Fig. 14. In actual practice it has not been found necessary to limit the relative positions of link and crank arm beyond the position of Fig. 14 and hence no means has been here illustrated. One of the reasons why a self locking action in the approximate position of Fig. 14 is not serious is that, even if such a self locking action should occur, most of the movements of the spring suspension in ordinary use take place between the positions of Figs. 15 and 14, and hence the parts would very shortly be unlocked of their own accord. The position of Fig. 17 is however extremely rare in actual practice, and hence, if self locking in this position should occur, it might be only after many months of service that the parts would automatically unlock themselves. Hence the distinct desirability of the stop arrangement shown in Fig. 18.

Figure 19:
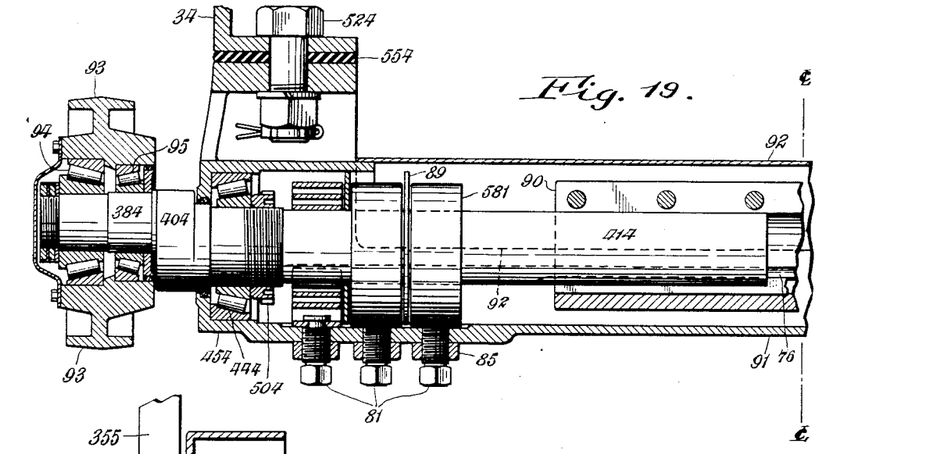
Fig. 19 is a vertical, longitudinal, fragmentary section showing spiral springs applied to the rock shaft of a three axle vehicle.

The present invention may also be applied to a three axle spring suspension such as that shown in my patent application Serial No. 595,973. Fig. 19 illustrates how spiral springs 581 are applied to the split crank shaft of such a three axle spring suspension. In this case the crank shaft sections 414 are solidly connected together by a split and keyed coupling 90 and each crank shaft is journaled in a bearing housing 454 which is bolted directly to the vehicle frame 34 by a single, large bolt 524, a resilient pad 554 being interposed between said frame and the upper horizontal flange of said bearing housing. The use of this single bolt 524, in conjunction with said resilient pad 554, permits distortion of the vehicle frame 34 without doing injury to the parts secured to said frame by said bolt 524. Because of the terrific strains carried by the eccentric member or crank pin 384 in such a three axle spring suspension, the same is preferably made integral with the crank arm 404 and also with the concentric member or rock shaft 414, these parts together constituting a crank shaft section. The crank shaft as a whole must necessarily be made in two sections to permit of assembling the bearings and the spiral springs, and it is these features principally which differentiate the application of the present invention to the three axle construction of Fig. 19 as compared with the two axle (or single axle trailer) construction of Figs. 1-18. In the preferred type of three axle construction shown in Fig. 19, the two bearing housings 454 are integrally joined by a channel shaped member 91, the open upper face of which is covered by a suitable cover plate 92. In this case the rock shaft bearings 444 are adjusted by an adjusting nut 504 which is threaded on the rack shaft 414. The walking beam 93 employed in the three axle construction is suitably journaled in the eccentric member or crank pin 384 on a pair of roller bearings 94, 95. For further details of the three axle construction see my patent application, Serial No. 595,973.

Figures 20, 21, 22, 23:
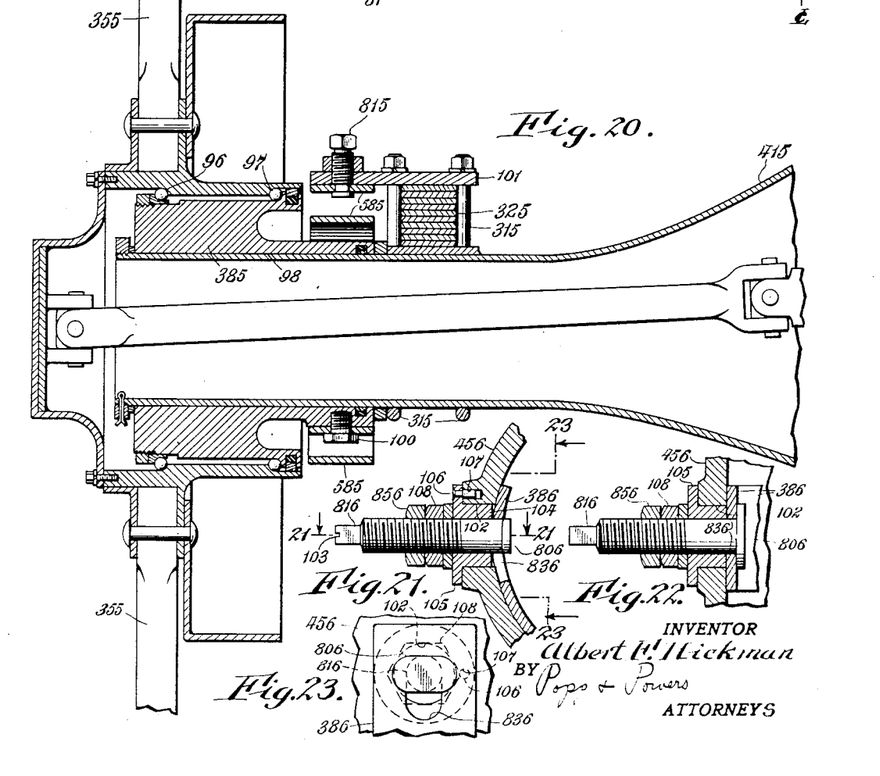
Fig. 20 is a vertical, longitudinal, fragmentary section through the drive axle of a vehicle provided with "floating" wheels equipped with spiral springs.
Fig. 21 is a vertical, transverse, fragmentary section thorugh the bearing housing and associated parts showing a modified method of securing the outer end of the spiral spring to said bearing housing.
Fig. 22 is a horizontal, fragmentary section thereof taken on line 22—22, Fig. 21.
Fig. 23 is a vertical, fragmentary elevational view thereof taken on line 23—23, Fig. 21.

In Fig. 20 is shown how the present invention is applied to my "non-bottoming" floating wheel construction which was originally disclosed in my patent application Serial No. 613,395. In this case the vehicle wheel 355 is journaled on ball bearings 96, 97 on the cylindrical periphery of an eccentric member 385, the latter being journaled eccentrically at 98 on the concentric member or axle housing 415. In this case a "non-bottoming" action is obtained by the eccentric, partial rotation of said eccentric member 385 about said axle housing. Resilient resistance to such rotation is afforded by a spiral spring 585, which is secured by a cap screw 100 at its inner end to the eccentric member 385 and is secured by a clamping bolt 815 (similar to the arrangement of Fig. 10) to the spring clip plate 101. The latter is in turn secured to the leaf spring 325 and also to the axle housing 415 by suitable spring clip bolts 315.

Figs. 21-23 illustrate a modified method of securing the outer part of the spiral springs 386 to the bearing housing 456. In this case a T-headed clamping bolt 816 is employed, the shank of said bolt being received with an elongated aperture 836 having the same shape as that of the head 806 of said T-clamping bolt 816. To clamp said spiral spring 386 in place, the T-head 806 of said clamping bolt is first passed inwardly through a large circular opening 102 formed in the bearing housing 456 and is then passed through the elongated aperture 836 of the spiral spring. The entire bolt is now given a quarter turn in the one or other direction, this operation being made convenient by having the tail end of said screw of square shape and also provided with a transverse slot 103 which is parallel to the long axis of the T-head and thus permits of visually determining (from the exterior of the bearing housing 456) whether said clamping bolt head 806 is in its desired position, either in its assembled position or when disassembling the same. An annular gland 104 having an annular flange 105 is now slipped over the shank of said bolt and into aforesaid circular opening 102. It is preferred to prevent rotation of said gland when in place, this being accomplished by, for instance, a stud pin 106 secured to the flange 105 of said gland and received within a hole 107 drilled eccentrically into the bearing housing parallel to the circular opening 102. A clamping nut 108 is now screwed down upon the threaded shank of said clamping bolt 816, thereby drawing the spiral spring outwardly toward said gland 104 and simultaneously drawing said gland inwardly against the outer face of the bearing housing 456. This is rendered possible by reason of the fact (see Fig. 22) that the spiral spring 386 spans the circular opening 102. The whole is then locked in place by a lock nut 856.

I claim as my invention:

1. A vehicle spring suspension comprising: a frame; a wheel having a spindle journaled thereon; a bearing connected with said frame; a rock shaft journaled in said bearing and having a crank arm; means for at all times exerting a resilient rotational force upon said rock shaft in the one direction only; and means connecting said crank arm and said spindle,—said means and the rest of the spring suspension being so arranged that said spindle is resiliently resisted when moving toward both its extreme upward position and its extreme downward position.

2. A vehicle spring suspension comprising: a frame; a wheel having a spindle journaled thereon; a bearing connected with said frame; a rock shaft journaled in said bearing and having a crank arm; means for at all times exerting a resilient rotational force upon said rock shaft in the one direction only; a spring connected with said spindle; and means connecting said crank arm and said spring,—said means and the rest of the spring suspension being so arranged that said spindle is resiliently resisted when moving toward both its extreme upward position and its extreme downward position.

3. A vehicle spring suspension comprising: a frame; a wheel having a spindle journaled thereon; a bearing connected with said frame; a rock shaft journaled in said bearing and having a crank arm; means for at all times exerting a resilient rotational force upon said rock shaft in the one direction only; a spring pivoted at its one end on the frame and centrally connected with said spindle; and means connecting the other end of said spring to said crank arm,—said means and the rest of the spring suspension being so arranged that said spindle is resiliently resisted when moving toward both its extreme upward position and its extreme downward position.

4. A vehicle spring suspension comprising: a frame; a wheel having a spindle journaled thereon; a bearing connected with said frame; a rock shaft journaled in said bearing and having a crank arm; means for at all times exerting a resilient rotational force upon said rock shaft in the one direction only; a semi-elliptic leaf spring pivoted at its front end on the frame and centrally connected with said spindle; and means connecting the other end of said spring to said crank arm,—said means and the rest of the spring suspension being so arranged that said spindle is resiliently resisted when moving toward both its extreme upward and its extreme downward position.

ALBERT F. HICKMAN.